| (12) | United States Patent<br>Yang | (10) Patent No.: US 11,546,106 B2<br>(45) Date of Patent: Jan. 3, 2023 |

(54) METHOD AND DEVICE FOR DETERMINING BEAM FAILURE DETECTION REFERENCE SIGNAL RESOURCE

(71) Applicant: VIVO MOBILE COMMUNICATION CO., LTD., Dongguan (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 163 days.

(21) Appl. No.: 17/030,381

(22) Filed: Sep. 24, 2020

(65) Prior Publication Data

US 2021/0014022 A1 Jan. 14, 2021

Related U.S. Application Data

(63) Continuation of application No. PCT/CN2019/077652, filed on Mar. 11, 2019.

(30) Foreign Application Priority Data

Mar. 27, 2018 (CN) .......................... 201810260590.X

(51) Int. Cl.
*H04W 4/00* (2018.01)
*H04L 5/00* (2006.01)
*H04B 17/309* (2015.01)
*H04W 24/10* (2009.01)

(52) U.S. Cl.
CPC ......... *H04L 5/0048* (2013.01); *H04B 17/309* (2015.01); *H04L 5/0023* (2013.01); *H04W 24/10* (2013.01)

(58) Field of Classification Search
CPC .... H04L 5/0048; H04L 5/0023; H04W 24/10; H04B 17/309
USPC ........................................................ 370/330
See application file for complete search history.

(56) References Cited

U.S. PATENT DOCUMENTS

2019/0274169 A1* 9/2019 Tsai ..................... H04W 56/003
2020/0221428 A1* 7/2020 Moon .................. H04W 72/042

FOREIGN PATENT DOCUMENTS

WO 2017024516 A1 2/2017

OTHER PUBLICATIONS

MediaTek Inc. ( R1-1803441, Athens, Greece, Feb. 26-Mar. 2, 2018, Summary 2 on Remaining issues on Beam Failure Recovery). (Year: 2018).*
ZTE, Sanechips ( R1-1801582, Athens, Greece, Feb. 26-Mar. 2, 2018, Remaining issues on Beam Recovery), see p. 4, section 3. (Year: 2018).*
Nokia, Nokia Shanghai Bell (R1-1802557, Athens, Greece, Feb. 26-Mar. 2, 2018, Remaining Details on Beam Recovery), see section 2.3. (Year: 2018).*

(Continued)

*Primary Examiner* — Maharishi V Khirodhar
(74) *Attorney, Agent, or Firm* — IPX PLLC

(57) ABSTRACT

Embodiments of this disclosure provide a method and a device for determining a beam failure detection reference signal (BFD RS) resource, applied to a user-side device. The method includes: determining the BFD RS resource based on a Transmission Configuration Indication (TCI) state of a control resource set when no BFD RS resource used for measurement of a BFD RS is configured.

14 Claims, 3 Drawing Sheets

(56) References Cited

OTHER PUBLICATIONS

Intel Corporation (R1-1802397, Athens, Greece, Feb. 26-Mar. 2, 2018, Remaining issues on Beam failure Recovery), see section 6, first paragraph on the 5th page. (Year: 2018).*
International Search Report issued in corresponding International Application No. PCT/CN2019/077652, dated May 16, 2019, 6 pages.
Vivo, "Remaining Issues on Mechanism to Recover from Beam Failure", 3GPP TSG RAN WG1 Meeting #92bis R1-1803818, Apr. 6, 2018, section 2.1.
ZTE et al., "Remaining Details on Beam Recovery", 3GPP TSG RAN WG1 Meeting #92 R1-1801582, Feb. 16, 2018, section 3, TP 1.
3GPP, "Physical Layer Procedures for Data", 3GPP TS 38.214 V15.0.0, Jan. 3, 2018, section 5.1.5.
Second Office Action issued in related Chinese application No. 201810260590.X, dated Aug. 3, 2020, 14 pages.
"Summary on remaing issues on beam failure recovery", MediaTek Inc. etc, 3GPP TSG RAN WG1 Meeting #92 R1,Mar. 2, 2018.

\* cited by examiner

METHOD AND DEVICE FOR DETERMINING BEAM FAILURE DETECTION REFERENCE SIGNAL RESOURCE

CROSS-REFERENCE TO RELATED APPLICATIONS

This application is a bypass continuation of PCT Application No. PCT/CN2019/077652 filed Mar. 11, 2019, which claims priority to Chinese Patent Application No. 201810260590.X, filed in China on Mar. 27, 2018, both of which are incorporated herein by reference in their entireties.

TECHNICAL FIELD

This disclosure relates to the communications field, and in particular, to a method and a device for determining a beam failure detection reference signal resource.

BACKGROUND

In a high-band communications system, because a wireless signal has a relatively short wavelength, signal propagation is more likely to be, for example, blocked, resulting in interruption of the signal propagation. Therefore, a beam failure recovery mechanism is currently introduced to a beam measurement mechanism of beam shaping. In the beam failure recovery mechanism, a network-side device configures a Beam Failure Detection Reference Signal (BFD RS) resource for a user-side device (also referred to as "User Equipment (UE)"), and the UE measures the BFD RS using the configured BFD RS resource and after determining that a beam failure event has occurred, reports a beam failure recovery request to the network-side device to facilitate beam failure recovery.

In the related art, the BFD RS resource is configured by the network-side device. However, how the UE determines a BFD RS resource when the network-side device does not configure any BFD RS resource for the UE has not been resolved.

SUMMARY

An objective of embodiments of this disclosure is to provide a method and a device for determining a BFD RS resource, applied to a user-side device, for determining a BFD RS resource when no BFD RS resource is configured.

For the objective mentioned above, according to a first aspect, an embodiment of this disclosure provides a method for determining a BFD RS resource, applied to a user-side device, including:
determining the BFD RS resource based on a Transmission Configuration Indication (TCI) state of a Control Resource Set (CORESET) when no BFD RS resource used for measurement of a BFD RS is configured.

According to a second aspect, an embodiment of this disclosure provides a user-side device, including:
a resource determination unit, configured to determine a BFD RS resource based on a TCI state of a CORESET when no BFD RS resource used for measurement of a BFD RS is configured.

According to a third aspect, an embodiment of this disclosure provides a user-side device, including: a memory, a processor, and a computer program stored in the memory and capable of running on the processor, where when the computer program is executed by the processor, the steps of the method according to the first aspect are implemented.

According to a fourth aspect, an embodiment of this disclosure provides a computer-readable storage medium. The computer-readable storage medium stores a computer program, and when the computer program is executed by a processor, the steps of the method according to the first aspect are implemented.

In the embodiments of this disclosure, the user-side device may determine a BFD RS resource according to a TCI state of a CORESET when no BFD RS resource used for BFD RS measurement is configured, allowing the user-side device to perform beam failure detection and beam failure recovery. This avoids a problem that the user-side device needs to perform radio link failure detection and re-establish a radio link upon detection of a radio link failure due to the inability to perform beam failure detection and beam failure recovery, reducing latency required for the user-side device to resume data transmission and improving data transmission performance of a communications system.

BRIEF DESCRIPTION OF DRAWINGS

The drawings described herein are used to provide a further understanding of this disclosure and constitute a part of this disclosure. The example embodiments of this disclosure and their descriptions are used to explain this disclosure, and do not constitute any inappropriate limitation on this disclosure. In the drawings.

DETAILED DESCRIPTION

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure. The use of "and/or" in the specification and the claims indicates at least one of the associated objects.

The technical solutions of this disclosure may be applied to various communications systems, such as a Global System for Mobile Communications (GSM), a Code Division Multiple Access (CDMA) system, a Wideband Code Division Multiple Access (WCDMA) system, a General Packet Radio Service (GPRS) system, a Long Term Evolution (LTE) system, a Long Term Evolution Advanced (LTE-A) system, and a New Radio (NR) system.

UE may also be referred to as a user-side device, a mobile terminal, a mobile user equipment, and so on. UE can communicate with one or more core networks via a radio access network, for example, a Radio Access Network (RAN). The user-side device may be a mobile terminal such as a mobile phone (also referred to as a "cellular" phone) and a computer provided with a mobile terminal, for example, a portable, pocket-sized, handheld, computer built-in, or in-vehicle mobile apparatus. These devices exchange voice and/or data with the radio access network.

A network-side device is configured to communicate with a user-side device, and may be a Base Transceiver Station (BTS) in GSM or CDMA, a NodeB in WCDMA, an evolved NodeB (eNB or e-NodeB) in LTE, or a 5G base station (gNB). This is not limited in this disclosure, but for ease of description, the following embodiments use the gNB as an example for description.

Considering that a network-side device does not configure any BFD RS resource for UE, the embodiments of this disclosure provide a method and a device for determining a BFD RS resource, which are described in detail in the following embodiments.

The abbreviations involved in the embodiments of this disclosure are as follows:
Control Resource Set (CORESET);
Transmission Configuration Indication (TCI);
Reference Signal (RS);
Quasi-Colocation (QCL);
Bandwidth Part (BWP);
Channel State Information-Reference Signal (CSI-RS);
Synchronization Signal Block (SSB);
Radio Resource Control (RRC);
Physical Downlink Control Channel (PDCCH);
Media Access Control (MAC);
Physical Random Access Channel (PRACH);
Beam Failure Detection (BFD);
Azimuth Angle of Arrival (AoA);
Azimuth Angle of Departure (AoD);
Reference Signal Receiving Power (RSRP).

Figure 1:
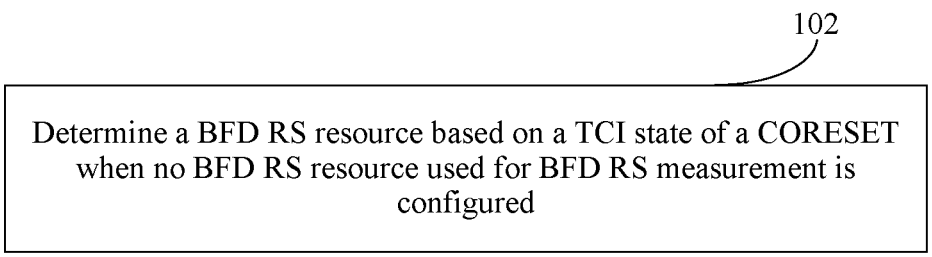
FIG. 1 is a schematic flowchart of a method for determining a BFD RS resource according to an embodiment of this disclosure.

An embodiment of this disclosure provides a method for determining a BFD RS resource. The method is applied to and may be executed by UE. FIG. 1 is a schematic flowchart of a method for determining a BFD RS resource according to an embodiment of this disclosure. As shown in FIG. 1, the method includes:

Step 102: Determine a BFD RS resource according to a TCI state of a CORESET when no BFD RS resource used for measurement of a BFD RS is configured.

In this embodiment of this disclosure, the user-side device may determine a BFD RS resource according to a TCI state of a CORESET when no BFD RS resource used for BFD RS measurement is configured, allowing the user-side device to perform beam failure detection and beam failure recovery. This avoids a problem that the user-side device needs to perform radio link failure detection and re-establish a radio link upon detection of a radio link failure due to the inability to perform beam failure detection and beam failure recovery, reducing latency required for the user-side device to resume data transmission and improving data transmission performance of a communications system.

In this embodiment, the TCI state is used to indicate an RS set, and accordingly, in step 102, determining a BFD RS resource according to a TCI state of a CORESET specifically includes: determining the BFD RS resource based on the RS set indicated by the TCI state.

In this embodiment, the RS set includes at least one RS index and a QCL type corresponding to the RS index, and accordingly, determining the BFD RS resource based on the RS set indicated by the TCI state specifically includes:

(1) determining from the RS set an RS index with the corresponding QCL type being a specified QCL type as a BFD RS resource index; and (2) determining the BFD RS resource based on the BFD RS resource index.

Table 1 is a schematic table of a correspondence between TCI states and RS sets according to an embodiment of this disclosure. Different TCI states correspond to different RS sets as shown in Table 1. In this embodiment of this disclosure, a TCI state may indicate one or more RS sets, which is not limited herein.

TABLE 1

| TCI state | RS set |
| --- | --- |
| State 1 | Set A |
| State 2 | Set B |

Table 2 is a schematic table of specific content included in an RS set according to an embodiment of this disclosure. As shown in Table 2, the RS set includes at least one RS index and a QCL type corresponding to the RS index.

TABLE 2

| RS set | |
| --- | --- |
| CSI-RS resource index 1 | QCL type A |
| CSI-RS resource index 2 | QCL type D |

The RS set includes at least one RS index, without any upper limit defined.

Table 1 and Table 2 are used as an example. In this embodiment, from the RS set, an RS index with the corresponding QCL type being a specified QCL type is determined as a BFD RS resource index, and then the BFD RS resource is determined based on the BFD RS resource index.

In a specific implementation, the specified QCL type includes: a type D, that is, type D, and from Table 1 and Table 2, the CSI-RS resource index 2 is determined as the BFD RS resource index, and then the BFD RS resource is determined based on the BFD RS resource index.

Further, in this embodiment, after the BFD RS resource is determined, a QCL parameter corresponding to the specified QCL type is determined as a QCL parameter of the BFD RS resource.

In one embodiment, the specified QCL type includes a type D, and the QCL parameter corresponding to the specified QCL type includes a spatial reception parameter (Spatial Rx parameter). Therefore, the QCL parameter of the BFD RS resource includes the spatial reception parameter.

In one embodiment, the spatial reception parameter includes at least one of the following:

AoA, dominant AoA, average AoA, Power Angular Spectrum of AoA (PAS of AoA), average AoD, Power Angular Spectrum of AoD (PAS of AoD), transmit channel correlation, receive channel correlation, transmit beamforming, receive beamforming, spatial channel correlation, and the like.

In this embodiment, the beneficial effects of setting the specified QCL type as the type D include: when the RS index with the QCL type being the QCL type D is determined from the RS set as the BFD RS resource, the spatial reception parameter of the BFD RS resource can also be determined, and the UE adjusts a receive beam according to the spatial reception parameter, so that the receive beam is aligned with a direction of transmitting the BFD RS resource by a gNB, thereby accurately measuring quality of the BFD RS resource, and determining whether a beam failure event has occurred based on the measurement result.

In one embodiment, the TCI state of the CORESET includes: a TCI state of a CORESET of a current BWP of a current cell.

Specifically, the network-side device uses RRC signaling to configure and indicate a TCI state of a CORESET for each CORESET of the current BWP of the current cell where the UE is located. The TCI state indicator of the CORESET is used to listen to a QCL parameter of a PDCCH on the CORESET, and all PDCCHs transmitted on the CORESET have the same TCI state.

Table 1 and Table 2 are used as an example. The UE listens to the PDCCH by using parameters of the QCL type A corresponding to the CSI-RS resource index 1, including a Doppler shift, a Doppler spread, an average delay, a delay spread, and the like, and a parameter of the QCL type D corresponding to the CSI-RS resource index 2, including the spatial reception parameter (Spatial Rx parameter). When the UE determines the CSI-RS resource index 2 as the BFD RS resource index, the UE determines the BFD RS resource based on the BFD RS resource index, and detects quality of a beam where the BFD RS resource is located.

In this embodiment, because the TCI state set for the CORESET includes the TCI state of the CORESET of the current BWP of the current cell, the UE can determine the BFD RS resource of the current BWP of the current cell based on the TCI state, thereby determining, based on a measurement result on the BFD RS resource, whether a beam failure event has occurred on the current BWP of the cell, where the current BWP is a current active BWP.

In this embodiment, the BFD RS includes: at least one of a periodic CSI-RS and an SSB.

Figure 2:
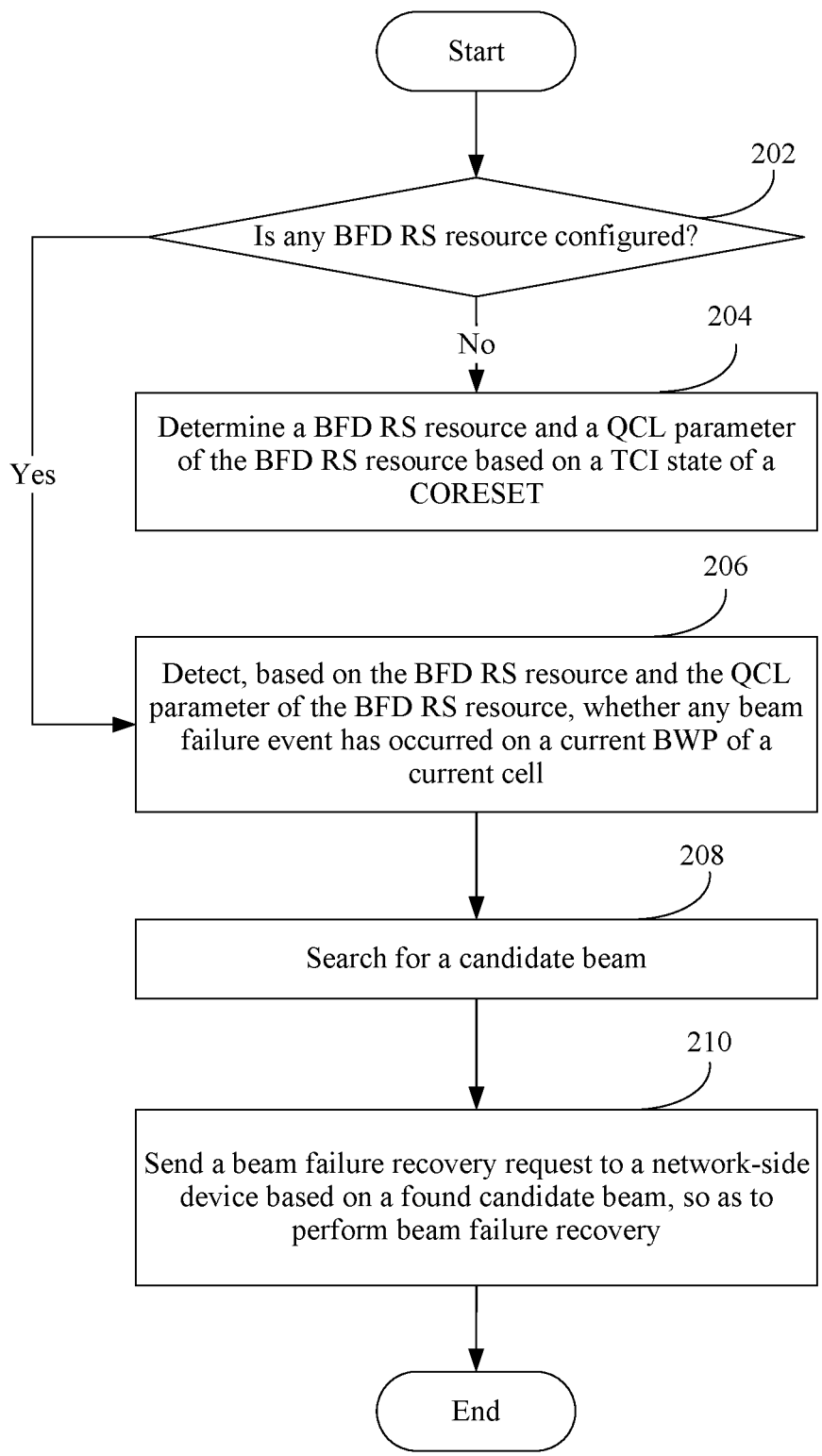
FIG. 2 is a schematic flowchart of a beam failure recovery method according to an embodiment of this disclosure.

FIG. 2 is a schematic flowchart of a beam failure recovery method according to an embodiment of this disclosure. The method may be applied to and executed by a user-side device. As shown in FIG. 2, the method includes:

Step 202: Determine whether any BFD RS resource is configured.

If a BFD resource is configured, step 206 is performed, or, if no BFD resource is configured, step 204 is performed.

Step 204: Determine a BFD RS resource and a QCL parameter of the BFD RS resource based on a TCI state of a CORESET.

This step is the same as the method in FIG. 1, and details are not repeated.

Step 206: Detect, based on the BFD RS resource and the QCL parameter of the BFD RS resource, whether any beam failure event has occurred on a current BWP of a current cell.

Specifically, the UE measures a BFD RS based on the BFD RS resource and the QCL parameter of the BFD RS resource at a physical layer, and determines, based on a measurement result, whether any beam failure event has occurred. If a beam failure event has occurred, step 208 is performed, or, if no beam failure event has occurred, the process is ended.

Step 208: Search for a candidate beam.

Specifically, the UE measures a candidate beam reference signal (candidate beam RS) at the physical layer to find a new candidate beam. When the physical layer of the UE receives a request or instruction or notification from a higher layer of the UE, it reports a measurement result that meets a preset condition to the higher layer of the UE, and the higher layer of the UE selects a candidate beam based on the report of the physical layer. The higher layer of the UE may be a MAC layer, and meeting a preset condition includes: measured quality of the candidate beam reference signal exceeding a preset threshold, where the report content includes an index of the candidate beam reference signal and quality of the candidate beam reference signal (such as RSRP).

Step 210: Send a beam failure recovery request to a network-side device based on a found candidate beam, so as to perform beam failure recovery.

The higher layer of the UE determines a PRACH resource based on the selected candidate beam. If the UE determines that a trigger condition for a beam failure recovery request is met, the UE sends the beam failure recovery request to the network-side device on the determined PRACH resource. The UE needs to send the beam failure recovery request according to a request sending count and/or request sending time configured by the network-side device, so as to perform beam failure recovery.

According to the method in FIG. 2, when a network-side device configures no BFD RS resource for UE, the UE may determine a BFD RS resource and a QCL parameter of the BFD RS resource based on a TCI state of a CORESET, so that the UE can still implement a beam failure detection and recovery mechanism with no BFD RS resource configured by the network-side device, without the need to perform radio link failure detection and re-establish a radio link upon detection of a radio link failure due to the inability to perform beam failure detection and beam failure recovery, reducing latency required to resume data transmission and improving data transmission performance of a communications system.

Corresponding to the method for determining a BFD RS resource according to the foregoing embodiments, this embodiment provides a user-side device. The user-side device provided in this embodiment of this disclosure can implement the processes implemented by the user-side device in the foregoing embodiments.

Figure 3:
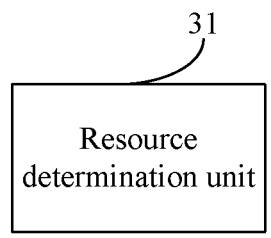
FIG. 3 is a schematic diagram of modular composition of a user-side device according to an embodiment of this disclosure.

FIG. 3 is a schematic diagram of modular composition of a user-side device according to an embodiment of this disclosure. As shown in FIG. 3, the user-side device includes:

a resource determination unit 31, configured to determine a BFD RS resource based on a TCI state of a CORESET when no BFD RS resource used for measurement of a BFD RS is configured.

Optionally, the TCI state is used to indicate a RS set; and the resource determination unit 31 is specifically configured to:

determine the BFD RS resource based on the RS set indicated by the TCI state.

Optionally, the RS set includes at least one RS index and a quasi-colocation QCL type corresponding to the RS index; and the resource determination unit 31 is specifically configured to:

determine from the RS set an RS index with the corresponding QCL type being a specified QCL type as a BFD RS resource index; and determine the BFD RS resource based on the BFD RS resource index.

Optionally, the specified QCL type includes: a type D.

Optionally, the user-side device further includes:

a parameter determination unit, configured to determine a QCL parameter corresponding to the specified QCL type as a QCL parameter of the BFD RS resource.

Optionally, the QCL parameter corresponding to the specified QCL type includes: a spatial reception parameter.

Optionally, the TCI state of the CORESET includes: a TCI state of a CORESET of a current BWP of a current cell.

Optionally, the BFD RS includes: at least one of a CSI-RS and a SSB.

In this embodiment of this disclosure, the user-side device may determine a BFD RS resource according to a TCI state of a CORESET when no BFD RS resource used for BFD RS measurement is configured, allowing the user-side device to perform beam failure detection and beam failure recovery. This avoids a problem that the user-side device needs to perform radio link failure detection and re-establish a radio link upon detection of a radio link failure due to the inability to perform beam failure detection and beam failure recovery, reducing latency required for the user-side device to resume data transmission and improving data transmission performance of a communications system.

Corresponding to the method for determining a BFD RS resource according to the foregoing embodiments, this embodiment provides a user-side device. The user-side device provided in this embodiment of this disclosure can implement the processes implemented by the user-side device in the foregoing embodiments.

Figure 4:
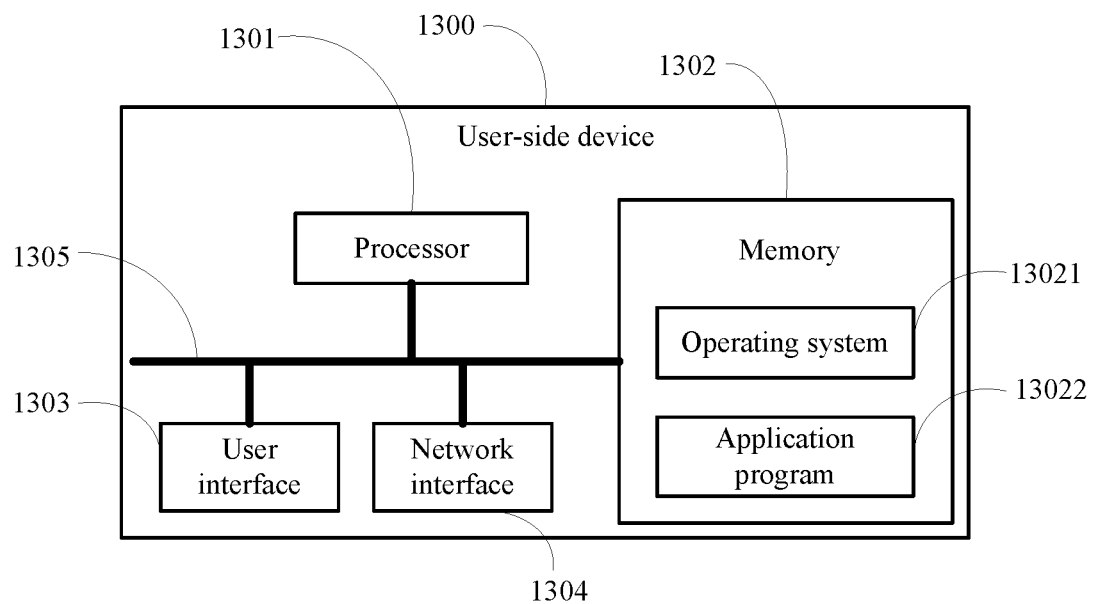
FIG. 4 is a schematic structural diagram of a user-side device according to an embodiment of this disclosure.

FIG. 4 is a schematic structural diagram of a user-side device according to an embodiment of this disclosure. As shown in FIG. 4, the user-side device 1300 includes: at least one processor 1301, a memory 1302, at least one network interface 1304, and a user interface 1303. The components of the user-side device 1300 are coupled together through a bus system 1305. It can be understood that the bus system 1305 is configured to implement connection and communication between these components. In addition to a data bus, the bus system 1305 also includes a power bus, a control bus, and a status signal bus. However, for clarity of description, various buses are marked as the bus system 1305 in FIG. 4.

The user interface 1303 may include a display, a keyboard, or a pointing device (for example, a mouse, a trackball, a touch panel, or a touchscreen).

It may be understood that the memory 1302 in this embodiment of this disclosure may be a volatile memory or a nonvolatile memory, or may include both a volatile memory and a nonvolatile memory. The nonvolatile memory may be a Read-Only Memory (ROM), a Programmable Read-Only Memory (PROM), an Erasable Programmable Read-Only Memory (EPROM), an Electrically Erasable Programmable Read-Only Memory (EEPROM), or a flash memory. The volatile memory may be a Random Access Memory (RAM), which is used as an external cache. By way of example but not restrictive description, many forms of RAMs may be used, for example, a Static Random Access Memory (SRAM), a Dynamic Random Access Memory (DRAM), a Synchronous Dynamic Random Access Memory (SDRAM), a Double Data Rate Synchronous Dynamic Random Access Memory (DDR SDRAM), an Enhanced Synchronous Dynamic Random Access Memory (ESDRAM), a Synchronous Link Dynamic Random Access Memory (SLDRAM), and a Direct Rambus Dynamic Random Access Memory (DRDRAM). The memory 1302 of the system and the user-side device described in this embodiment of this disclosure is intended to include but not be limited to these and any other applicable types of memories.

In some implementations, the memory 1302 stores the following elements: executable modules or data structures, a subset thereof, or an extended set thereof: an operating system 13021 and an application program 13022.

The operating system 13021 includes various system programs, for example, a framework layer, a core library layer, and a driver layer, for implementing various basic services and process hardware-based tasks. The application program 13022 includes various application programs, for example, a media player and a browser, and is configured to implement various application services. A program for implementing the method of the embodiments of this disclosure may be included in the application program 13022.

In an embodiment of this disclosure, the user-side device 1300 further includes: a memory 1302, a processor 1301, and a computer program stored in the memory 1302 and capable of running on the processor 1301. When the computer program is executed by the processor 1301, the following step is implemented:

determining a BFD RS resource based on a TCI state of a CORESET when no BFD RS resource used for measurement of a BFD RS is configured.

The method disclosed in the foregoing embodiments of this disclosure may be applied to the processor 1301, or may be implemented by the processor 1301. The processor 1301 may be an integrated circuit chip that has a signal processing capability. In an implementation process, the steps in the foregoing method can be implemented by using hardware integrated logic circuits in the processor 1301, or by using instructions in the form of software. The processor 1301 may be a general-purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The processor 1301 can implement or execute the methods, steps, and logical block diagrams that are disclosed in the embodiments of this disclosure. The general-purpose processor may be a microprocessor, or the processor may be any conventional processor or the like. The steps of the method disclosed with reference to the embodiments of this disclosure may be directly executed and completed by a hardware decoding processor, or may be executed and completed by a combination of hardware and software modules in a decoding processor. A software module may be located in a computer-readable storage medium mature in the art, such as a random access memory, a flash memory, a read-only memory, a programmable read-only memory or electrically erasable programmable memory, or a register. The computer-readable storage medium is located in the memory 1302, and the processor 1301 fetches information in the memory 1302 and completes the steps of the foregoing method in combination with its hardware. Specifically, the computer-readable storage medium stores a computer program, and when the computer program is executed by the processor 1301, the steps in the foregoing embodiments are implemented.

It can be understood that the embodiments of this disclosure may be implemented by hardware, software, firmware, middleware, microcode, or a combination thereof. For hardware implementation, the embodiments may be implemented in one or more ASICs, DSPs, Digital Signal Processing Devices (DSPDs), Programmable Logic Devices (PLDs), FPGAs, general-purpose processors, controllers, microcontrollers, microprocessors, and other electronic units for performing the functions described in this disclosure, or a combination thereof.

For software implementation, the technology described in the embodiments of this disclosure may be implemented by modules (for example, procedures or functions) that perform the functions described in the embodiments of this disclosure. Software code may be stored in the memory and executed by the processor. The memory may be implemented inside or outside the processor.

Optionally, when the computer program is executed by the processor 1301, the TCI state is used to indicate a RS set; and determining a BFD RS resource based on a TCI state of a CORESET includes:

determining the BFD RS resource based on the RS set indicated by the TCI state.

Optionally, when the computer program is executed by the processor 1301, the RS set includes at least one RS index and a quasi-colocation QCL type corresponding to the RS index; and determining the BFD RS resource based on the RS set indicated by the TCI state includes:

determining from the RS set an RS index with the corresponding QCL type being a specified QCL type as a BFD RS resource index; and determining the BFD RS resource based on the BFD RS resource index.

Optionally, when the computer program is executed by the processor 1301, the specified QCL type includes: a type D.

Optionally, when the computer program is executed by the processor 1301, the following is further included:

determining a QCL parameter corresponding to the specified QCL type as a QCL parameter of the BFD RS resource.

Optionally, when the computer program is executed by the processor 1301, the QCL parameter corresponding to the specified QCL type includes: a spatial reception parameter.

Optionally, when the computer program is executed by the processor 1301, the TCI state of the CORESET includes: a TCI state of a CORESET of a current BWP of a current cell.

Optionally, when the computer program is executed by the processor 1301, the BFD RS includes: at least one of a CSI-RS and a SSB.

In this embodiment of this disclosure, the user-side device may determine a BFD RS resource according to a TCI state of a CORESET when no BFD RS resource used for BFD RS measurement is configured, allowing the user-side device to perform beam failure detection and beam failure recovery. This avoids a problem that the user-side device needs to perform radio link failure detection and re-establish a radio link upon detection of a radio link failure due to the inability to perform beam failure detection and beam failure recovery, reducing latency required for the user-side device to resume data transmission and improving data transmission performance of a communications system.

The user-side device 1300 may implement the processes implemented by the user-side device in the foregoing embodiments. To avoid repetition, details are not further described herein.

An embodiment of this disclosure further provides a computer-readable storage medium. The computer-readable storage medium stores a computer program, and when the computer program is executed by a processor, the following process is implemented:

determining a BFD RS resource based on a TCI state of a CORESET when no BFD RS resource used for measurement of a BFD RS is configured.

Optionally, when the computer program is executed by the processor, the TCI state is used to indicate a RS set; and determining a BFD RS resource based on a TCI state of a CORESET includes:

determining the BFD RS resource based on the RS set indicated by the TCI state.

Optionally, when the computer program is executed by the processor, the RS set includes at least one RS index and a quasi-colocation QCL type corresponding to the RS index; and determining the BFD RS resource based on the RS set indicated by the TCI state includes:

determining from the RS set an RS index with the corresponding QCL type being a specified QCL type as a BFD RS resource index; and determining the BFD RS resource based on the BFD RS resource index.

Optionally, when the computer program is executed by the processor, the specified QCL type includes: a type D.

Optionally, when the computer program is executed by the processor, the following is further included:

determining a QCL parameter corresponding to the specified QCL type as a QCL parameter of the BFD RS resource.

Optionally, when the computer program is executed by the processor, the QCL parameter corresponding to the specified QCL type includes: a spatial reception parameter.

Optionally, when the computer program is executed by the processor, the TCI state of the CORESET includes: a TCI state of a CORESET of a current BWP of a current cell.

Optionally, when the computer program is executed by the processor, the BFD RS includes: at least one of a CSI-RS and a SSB.

In this embodiment of this disclosure, the user-side device may determine a BFD RS resource according to a TCI state of a CORESET when no BFD RS resource used for BFD RS measurement is configured, allowing the user-side device to perform beam failure detection and beam failure recovery. This avoids a problem that the user-side device needs to perform radio link failure detection and re-establish a radio link upon detection of a radio link failure due to the inability to perform beam failure detection and beam failure recovery, reducing latency required for the user-side device to resume data transmission and improving data transmission performance of a communications system.

When the computer program is executed by the processor, the processes in the foregoing embodiments of the method for determining a BFD RS resource can be implemented with the same technical effects. To avoid repetition, details are not further described herein. The computer-readable storage medium is, for example, a ROM, a RAM, a magnetic disk, or an optical disc.

A person of ordinary skill in the art may be aware that the units and algorithmic steps in the examples described with reference to the embodiments disclosed herein may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of the embodiments of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

For the several embodiments provided in this disclosure, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, devices or units, and may be in electrical, mechanical, or other forms.

The units described as separate parts may or may not be physically separate. Components displayed as units may or may not be physical units, that is, they may be located in one position, or may be distributed on a plurality of network units. Some or all of the units may be selected based on actual requirements to achieve the objectives of the solutions of the embodiments.

In addition, the functional units in the embodiments of this disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in the embodiments of this disclosure essentially, or the part contributing to the prior art, or some of the technical solutions may be embodied in the form of a software product. The computer software product is stored in a storage medium, and includes several instructions for instructing a computer device (which may be a personal computer, a server, a network device, or the like) to perform all or some of the steps of the method described in the embodiments of this disclosure. The preceding storage medium includes: any medium capable of storing program code, such as a USB flash drive, a removable hard disk, a read-only memory, a random access memory, a magnetic disk, or an optical disc.

The foregoing descriptions are merely specific implementations of the embodiments of this disclosure, but are not intended to limit the protection scope of the embodiments of this disclosure. Any variation or replacement readily figured out by a person skilled in the art within the technical scope disclosed in the embodiments of this disclosure shall fall within the protection scope of the embodiments of this disclosure. Therefore, the protection scope of the embodiments of this disclosure shall be subject to the protection scope of the claims.

What is claimed is:

1. A method for determining a Beam Failure Detection Reference Signal (BFD RS) resource, executed by a user-side device, the method comprising:
    determining the BFD RS resource based on a Transmission Configuration Indication (TCI) state of a Control Resource Set (CORESET) when no BFD RS resource is configured for the user-side device to measure BFD RS, wherein:
        the TCI state is used to indicate a Reference Signal (RS) set, and the RS set comprises at least one RS index and a Quasi-Colocation (QCL) type corresponding to the RS index; and
        determining the BFD RS resource based on a TCI state of a CORESET comprises:
            determining from the RS set an RS index with a corresponding QCL type being a specified QCL type as a BFD RS resource index; and
            determining the BFD RS resource based on the BFD RS resource index.

2. The method according to claim 1, wherein the specified QCL type comprises: a type D.

3. The method according to claim 1, further comprising:
    determining a QCL parameter corresponding to the specified QCL type as a QCL parameter of the BFD RS resource.

4. The method according to claim 3, wherein the QCL parameter corresponding to the specified QCL type comprises: a spatial reception parameter.

5. The method according to claim 1, wherein the TCI state of the CORESET comprises: a TCI state of a CORESET of a current Bandwidth Part (BWP) of a current cell.

6. The method according to claim 1, wherein the BFD RS comprises at least one of a periodic Channel State Information Reference Signal (CSI-RS) or a Synchronization Signal Bock (SSB).

7. A user-side device, comprising:
    a processor comprising a resource determination unit, configured to determine a BFD RS resource based on a TCI state of a CORESET when no BFD RS resource is configured for the user-side device to measure BFD RS, wherein:
        the TCI state is used to indicate a Reference Signal (RS) set, and the RS set comprises at least one RS index and a Quasi-Colocation (QCL) type corresponding to the RS index; and
        determining the BFD RS resource based on a TCI state of a CORESET comprises:
            determining from the RS set an RS index with a corresponding QCL type being a specified QCL type as a BFD RS resource index; and
            determining the BFD RS resource based on the BFD RS resource index.

8. The device according to claim 7, wherein the specified QCL type comprises: a type D.

9. The device according to claim 7, wherein the processor further comprises:
    a parameter determination unit, configured to determine a QCL parameter corresponding to the specified QCL type as a QCL parameter of the BFD RS resource.

10. The device according to claim 9, wherein the QCL parameter corresponding to the specified QCL type comprises: a spatial reception parameter.

11. The device according to claim 7, wherein the TCI state of the CORESET comprises: a TCI state of a CORESET of a current BWP of a current cell.

12. The device according to claim 7, wherein the BFD RS comprises: at least one of a periodic CSI-RS or an SSB.

13. A non-transitory computer-readable storage medium, storing a computer program that, when executed by a processor of a user-side device, causes the processor to implement operations comprising:
    determining the BFD RS resource based on a TCI state of a CORESET when no BFD RS resource is configured for the user-side device to measure BFD RS, wherein:
        the TCI state is used to indicate a Reference Signal (RS) set, and the RS set comprises at least one RS index and a Quasi-Colocation (QCL) type corresponding to the RS index; and
        determining the BFD RS resource based on a TCI state of a CORESET comprises:
            determining from the RS set an RS index with a corresponding QCL type being a specified QCL type as a BFD RS resource index; and determining the BFD RS resource based on the BFD RS resource index.

14. The non-transitory computer-readable storage medium according to claim 13, wherein the specified QCL type comprises: a type D.

* * * * *